United States Patent [19]
Burgett et al.

[11] 3,784,973
[45] Jan. 8, 1974

[54] LIQUID LEVEL MAGNETIC GAUGE CIRCUITRY

[75] Inventors: James F. Burgett, Garden City; Lawrence J. Vanderberg; Gary F. Woodward, both of Ann Arbor, all of Mich.

[73] Assignee: Ford Motor Company, Dearborn, Mich.

[22] Filed: May 22, 1972

[21] Appl. No.: 255,608

[52] U.S. Cl. ............... 340/59, 340/244 R, 340/262, 200/61.45
[51] Int. Cl. ............................................ G08b 21/00
[58] Field of Search ............... 340/52 H, 59, 244 R, 340/244 A–244 D, 262, 181; 200/61.45, 61.52

[56] References Cited
UNITED STATES PATENTS
3,675,227   7/1972   Fukasawa ..................... 340/244 A
3,238,518   3/1966   Ballou ............................. 340/59 X

*Primary Examiner*—Alvin H. Waring
*Attorney*—Robert W. Brown

[57] ABSTRACT

Magnetic gauge circuitry in which a magnetic gauge has a plurality of coils and has indicating means responsive to current in the coils is provided with switching means for interrupting the current flowing to the coils. The gauge may be constructed to maintain its reading even though its input current has been interrupted. Current interruption to the gauge occurs when the switching means undergoes accelerations or decelerations or a change in its orientation with respect to the earth's gravitational field. The magnetic gauge circuitry is particularly advantageous when used in the measurement of the liquid level in a fuel tank of a motor vehicle.

4 Claims, 6 Drawing Figures

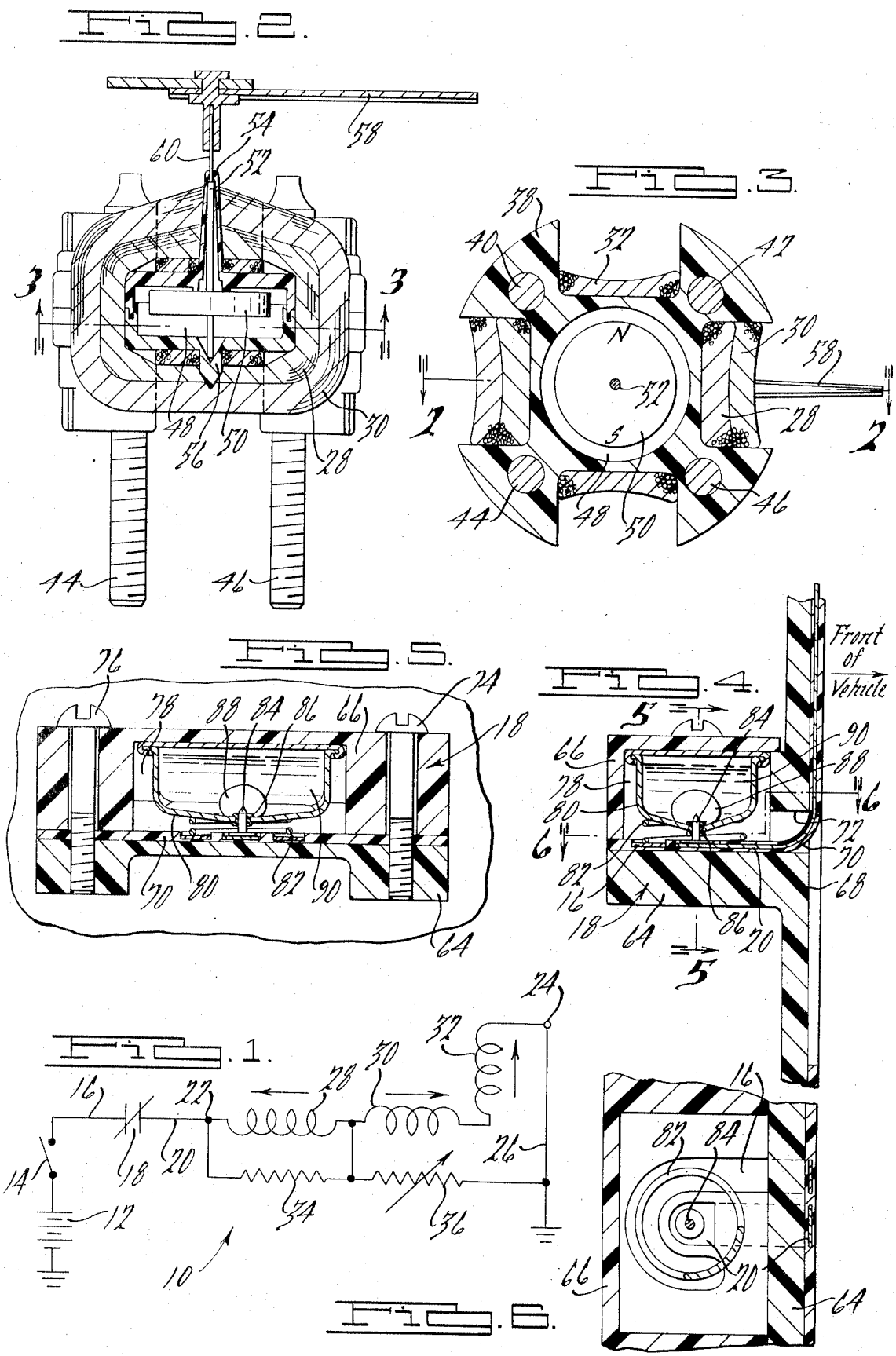

LIQUID LEVEL MAGNETIC GAUGE CIRCUITRY

BACKGROUND OF THE INVENTION

This invention relates to magnetic gauge circuitry and, more particulary, relates to magnetic gauge circuitry used to indicate the level of a liquid. The invention is particularly suitable for use in the indication of liquid level in the fuel tank of a motor vehicle.

The use of magnetic gauges to indicate liquid levels is well known. These gauges have the capability of rapid response to changes in liquid level. Unfortunately, it is this rapid response capability that creates some problem with their use in the indication of liquid level in the fuel tank of a motor vehicle because acceleration and deceleration of the vehicle, turning it, or causing it to go uphill or downhill results in temporary fuel level changes in the tank. The fuel sloshes about in the tank and its level, at the location of the level sensor that controls the signal to the magnetic gauge, changes with changes in the orientation of the fuel tank relative to the earth's gravitational field.

A typical magnetic gauge circuit for indicating liquid level in a motor vehicle fuel tank comprises a source of electrical energy connected to a magnetic gauge having a plurality of coils and having indicating means responsive to current in the coils. The current in the coils, and thus the magnetic gauge indication, is controlled by a variable resistance located in the vehicle's fuel tank. The variable resistance is controlled by a float mechanism. The position of the float, and hence the resistance, is determined by the liquid level in the fuel tank. As the vehicle accelerates and decelerates, turns, goes uphill or downhill, and traverses bumps and the like, the liquid level at the fuel tank float location is subject to considerable fluctuation in the absence of preventive measures. Such fluctuations can cause erratic magnetic gauge indications.

One frequently used method for preventing rapid fluctuations of the float mechanism is to enclose the float in a cylinder which is sealed except for small orifices at its upper end lower portions. The float moves vertically within the cylinder on a shaft, which may include a wound resistance wire, in response to changes in fuel level within the cylinder. Under static fuel tank conditions, the liquid level within the cylinder is the same as that outside the cylinder. However, during acceleration and deceleration of the vehicle and due to changes in its orientation relative to the earth's gravitation field, the fuel level outside of the cylinder may fluctuate. Corresponding fluctuations do not occur within the cylinder because the liquid therein is constrained to flow through the small orifice at the lower end of the cylinder. Thus, the liquid within the cylinder and the float position therein is effectively isolated from transient changes in fuel level outside of the cylinder.

The present invention eliminates the previous need for float mechanism isolation in a magnetic gauge circuit used to indicate liquid level in a fuel tank through the use in a magnetic gauge circuit of switching means for interrupting the flow of current from the source of electrical energy to the magnetic gauge and associated circuit components. This input interruption to the magnetic gauge circuitry is accomplished by the use of a switching device that is sensitive to its orientation relative to the direction of the force of gravity and that is also sensitive to the acceleration and deceleration of the structure or vehicle in which it is mounted. Thus, the present invention pertains to magnetic gauge circuitry having gravitational and/or acceleration sensitive switching means for effecting magnetic gauge input current interruption. The input current interruption occurs at predetermined orientations of the switching means relative to the earth's gravitational field and at predetermined levels of acceleration or deceleration. Moreover, the invention provides a novel switching device which may be used to accomplish this input current interruption.

BRIEF DESCRIPTION OF THE DRAWINGS

FIG. 1 is a schematic diagram of magnetic gauge circuitry in accordance with the invention;

FIG. 2 is an enlarged sectional view of a magnetic gauge of known design that may be employed in the circuitry of FIG. 1, the section being taken along the line 2—2 of FIG. 3;

FIG. 3 is an enlarged sectional view of the magnetic gauge of FIG. 2, the section being taken along the line 3—3 of FIG. 2;

FIG. 4 is an enlarged sectional view of a gravitationally and acceleration sensitive switching device;

FIG. 5 is an enlarged sectional view of the switching device of FIG. 4, the section being taken along the line 5—5 of FIG. 4; and FIG. 6 is an enlarged partial sectional view of the switching device of FIGS. 4 and 5, the section being taken along the line 6—6 of FIG. 4.

DETAILED DESCRIPTION

Reference is made to the drawings wherein like numerals correspond to like elements in the several Figures. In FIG. 1, there is shown a schematic diagram of magnetic gauge circuitry constructed in accordance with the invention and suitable for use in the indication of the liquid level in the fuel tank of a motor vehicle. The magnetic gauge circuitry, generally designated by the numeral 10, comprises a source of electrical energy 12, such as a vehicle storage battery, having one of its terminals connected to ground and its other terminal connected to an ignition switch 14. An electrical lead 16 connects the ignition switch 14 to a normally closed switch 18 that is mounted in the vehicle and that is sensitive to vehicle acceleration and deceleration as well as to its orientation relative to the earth's gravitational field. A lead 20 connects the switch 18 to one terminal 22 of a magnetic gauge, the other terminal 24 of which is connected to ground by a lead 26. The magnetic gauge includes three serially connected coils 28, 30 and 32.

The magnetic gauge coils 28, 30 and 32 are physically positioned relative to one another such that their magnetic fields have the directional orientations indicated by the arrows adjacent the coils. Thus, when current flows through the coils 28, 30 and 32, the magnetic field developed by the coil 28 is opposed or bucked by the magnetic field developed by the coil 30. The magnetic field of the coil 32 is directed at right angles to the magnetic fields developed by the coils 28 and 30. The direction of the vector resultant of these magnetic fields determines the position of indicating means associated with the magnetic gauge. Preferably, the magnetic gauge is constructed such that opening of the switch 18 does not cause the indicating means of the magnetic gauge to change its position.

A resistor 34 is connected in parallel with the magnetic gauge coil 28 and determines the amount of current that flows through the coil 28. The resistor 34 is not essential to operation of the magnetic gauge circuitry, but it is desirable in that it can be used for gauge calibration and limits the current through the coil 28 while simultaneously reducing the voltage drop across it. A typical valve for the resistor 34 is 90 ohms.

A variable resistance 36 is connected in parallel with the serially connected magnetic gauge coils 30 and 32. The variable resistance 36 is positioned in the vehicle's fuel tank and may be varied by means of a simple unenclosed float mechanism. A typical range of resistance values for the variable resistance 36 is from 0 ohms when the fuel tank is empty to 90 ohms when the fuel tank is full. An intermediate range could also be used, such as 10 ohms when the fuel tank is empty to 73 ohms when the fuel tank is full. From the circuit of FIG. 1, it is apparent that when the resistance 36 is 0 ohms or a very low value, little or no current flows through the magnetic gauge coils 30 and 32. Thus, the magnetic field produced in the magnetic gauge results almost entirely from the current in the coil 28. This causes the magnetic gauge indicating means to indicate an empty fuel tank condition. As the resistance 36 increases, more and more current flows through the serially connected coils 30 and 32. The magnetic field developed by the coil 30 opposes the field of the coil 28, and the magnetic field developed by the coil 32 increases in magnitude with the field direction indicated. The deflection torque or force acting on the magnetic gauge indicating means is determined by the vector resultant of the interacting magnetic fields produced by the coils 28, 30 and 32.

With reference now to the sectional views of FIGS. 2 and 3, there is shown a magnetic gauge of a construction utilized in many motor vehicles manufactured in the United States. The magnetic gauge includes a plastic housing 38 having mounting studs 40, 42, 44, and 46 made from non-magnetic material. Positioned within a chamber 48 in the housing 38 is a disc-shaped permanent magnet 50 having a north pole N and a south pole S. The permanent magnet 50 is attached to a shaft 52 that is journalled in bearings 54 and 56 for rotation therein. A pointer 58 is attached to a reduced-diameter extension 60 of the shaft 52. The permanent magnet 50 and the pointer 58 attached to the rotatable shaft 52 constitutes the indicating means for the magnetic gauge.

The coils 28 and 30 are electrically connected in series with one another and are positioned on top of one another. Connected in series with the coils 28 and 30 is the coil 32, and the coil 32 is positioned at right angles with respect to the coils 28 and 30.

Permanent magnet disc 50 of the magnetic gauge of FIGS. 2 and 3 and the pointer 58 attached for rotation with it are shown in the position they would assume were little or no current to flow through the coils 30 and 32. The presence of current in the coils 30 and 32 causes the permanent magnet 50 and the pointer 58 to rotate to a position determined by the vector resultant of the magnetic fields of the coils. Preferably, this rotation is damped by means of a silicone fluid contained within the chamber 48 of the plastic housing 38. If the magnetic gauge is mechanically balanced and has its rotation damped, then the pointer 58 will retain, for a substantial period of time, the position it occupies at the instant current to the coils 28, 30, and 32 is interrupted, such as may occur by the opening of the ignition switch 14 or the switch 18 of the circuit of FIG. 1.

With particular reference now to FIGS. 4 through 6, there is shown a preferred construction for the acceleration and gravity sensitive switch 18. This preferred form of the switch 18 includes a housing formed from a first nonconductive member 64 and a second nonconductive member 66. The housing members 64 and 66 define an enclosed chamber 78. Preferably, the first housing member 64 is integral with a portion of the instrument panel of a motor vehicle and has an electrical printed circuit material 68 attached to its back portion. The printed circuit material 68 has a flap 70 folded through an opening 72 in the housing member 64. This flap 70 is clamped between the housing members 64 and 66 by means of screws 74 and 76. The printed circuit material 68 has conductive elements embedded within a suitable nonconductive material. Electrical contact with these elements is made by removal of the nonconductive material covering the area at which electrical contact is to be made.

A conductive switch casing 80 is positioned within the chamber 78 and is held in position with a conductive compression spring 82 positioned between the bottom of the casing 80 and the flap 70 of the printed circuit material 68. An electrode 84 extends through the central region of the bottom portion of the switch casing 80 and is electrically insulated from the casing 80 by a nonconductive grommet 86.

A conductive ball 88, which may be a conductive liquid such as mercury, is positioned within the switch casing 80. As shown in FIGS. 4 and 5, the conductive ball 88 is in electrical contact with both the switch casing 80 and the electrode 84. It should be noted that the switch casing 80 is of substantially rectangular cross-section and has its bottom portion sloped toward the central region thereof wherein the electrode 84 is located.

The switch 18 may be positioned within the motor vehicle with the front of the vehicle being in the direction indicated in FIG. 4. In such case, acceleration of the vehicle will cause the conductive ball 88 to move to the left as viewed in FIG. 4 and deceleration will cause it to move to the right. Similarly, a left turn of the motor vehicle will cause the conductive ball 88 to move toward the right as viewed in FIG. 5, and a right turn will cause the conductive ball 88 to move toward the left. Thus, the switch 18 is acceleration and deceleration sensitive and these terms as used herein are intended to emcompass centripetal accelerations that may occur, for example, when a vehicle rounds a curve in a road or makes a turn. Also, the switch 18 is sensitive to the direction of the earth's gravitational field. For example, if the motor vehicle is upwardly inclined, the conductive ball 88 will move toward the left as viewed in FIG. 4 and if the vehicle is downwardly inclined, the conductive ball 88 will move toward the right. If the motor vehicle is tilted to either side, the conductive ball 88 will move to the left or right as viewed in FIG. 5. In summary, the switch 18 has a ball of mercury or other conductive material 88 which is sensitive to acceleration and deceleration forces and to the direction of the force of gravity acting on it. Movement of the conductive ball 88 a predeterminable distance in any direction away from the central region of the bottom of the switch casing 80 breaks the electrical contact between the electrode 84 and the switch casing 80. Thus, the switch 18 is a normally closed switch which opens in response to the various above-described forces which may act upon it. Of course, interruption of the gauge input current can also be achieved by the use of a normally open switch placed in parallel with the gauge. In this case, the closure of the switch would shunt the current around the gauge.

A nonconductive fluid 90 may fill the switch casing 80 and surround the conductive mercury ball 88 to prevent oxidation of the mercury. The nonconductive fluid 90 may be silicone or an oil and its viscosity may be chosen to provide a desired damping of the movement of the mercury ball 88.

The leads 16 and 20 to the switch 18 preferably are incorporated in the printed circuit material 68, and may be constructed in the manner shown in FIG. 6. Care must be taken to see that the conductive compression spring 82 does not come into electrical contact with the lead 20 in the region where the spring crosses this lead.

From the foregoing, it is apparent that the gravity and acceleration sensitive switch of the invention interrupts current to a magnetic gauge when there occurs a predetermined change in the orientation of the switch relative to the earth's gravitational field or a predetermined level of a acceleration or deceleration of the switch. When used as a part of a liquid level indicating system for a motor vehicle, the gravity and acceleration sensitive switch interrupts the input current to the magnetic gauge. This prevents erratic gauge indications that might otherwise occur. In this application, the float mechanism positioned in the vehicle's fuel tank to vary a resistance may be of very simple construction. Means previously required for damping movement of and for isolating the float mechanism to prevent undesirable gauge fluctuations are not required with the circuitry of the invention.

Based upon the foregoing description of the invention, what is claimed and desired to be protected by Letters Patent is:

1. Magnetic gauge circuitry for indicating the level of a liquid in a tank attached to a motor vehicle, said magnetic gauge circuitry comprising:

a magnetic gauge having a plurality of coils and having indicating means responsive to current in said coils;

means for supplying current to said gauge coils;

means for varying current through said gauge coils in response to changes in the level of said liquid in said motor vehicle tank; and switching means for interrupting current flow to said gauge coils, said switching means including a conductive casing affixed to said motor vehicle, said conductive casing being cup-shaped and having a rectangular cross-section, the bottom of said cup-shaped casing being sloped toward its central region, said conductive casing containing a movable conductor within it, said switching means further including an electrode positioned within said conductive casing and insulated therefrom, said conductor being movable on said sloped bottom of said casing and into and out of electrical contact with said electrode in response to changes in orientation and acceleration of said vehicle.

2. Magnetic gauge circuitry in accordance with claim 1, which further comprises: a housing attached to said vehicle, said housing having a chamber within it, said conductive switch casing being positioned within said housing; and a conductive compression spring in electrical contact with said switch casing and positioned between it and said housing to hold said conductive casing in position within said housing and to provide a current path between said conductive casing and other portions of said magnetic gauge circuitry.

3. Magnetic gauge circuitry in accordance with claim 2, wherein said switching means further comprises a printed circuit material having a first lead in electrical contact with said spring and a second lead in electrical contact with said electrode.

4. Magnetic gauge circuitry in accordance with claim 3, wherein said vehicle includes an instrument panel and wherein said housing comprises a first nonconductive member integral with said instrument panel and a second nonconductive member attached to said first nonconductive member, said first and second nonconductive members forming said chamber wherein said switch casing is positioned, said housing having an opening therein through which said printed circuit material passes into said housing chamber, said compression spring being in electrical contact with said printed circuit material within said chamber.

* * * * *